United States Patent [19]
Cox, Jr. et al.

[11] Patent Number: 5,237,316
[45] Date of Patent: Aug. 17, 1993

[54] VIDEO DISPLAY WITH HIGH SPEED RECONSTRUCTION AND DISPLAY OF COMPRESSED IMAGES AT INCREASED PIXEL INTENSITY RANGE AND RETROFIT KIT FOR SAME

[75] Inventors: Jerome R. Cox, Jr.; Stephen M. Moore, both of St. Louis, Mo.

[73] Assignee: Washington University, St. Louis, Mo.

[21] Appl. No.: 474,149

[22] Filed: Feb. 2, 1990

[51] Int. Cl.$^5$ .................................... B09G 33/00
[52] U.S. Cl. ................................. 340/793; 382/56; 358/261.2
[58] Field of Search ............... 340/731, 793; 358/133, 358/261.1, 56, 261.2, 261.3; 382/56

[56] References Cited

U.S. PATENT DOCUMENTS

| | | | |
|---|---|---|---|
| 4,125,861 | 11/1978 | Mounts et al. | 358/133 |
| 4,125,873 | 11/1978 | Chesarek | 358/133 |
| 4,360,840 | 11/1982 | Wolfram et al. | 358/261.1 |
| 4,399,457 | 8/1983 | Riederer et al. | 358/111 |
| 4,458,267 | 7/1984 | Dolazza | 358/111 |
| 4,482,918 | 11/1984 | Keyes et al. | 358/111 |
| 4,496,944 | 1/1985 | Collmeyer et al. | 340/723 |
| 4,628,355 | 12/1986 | Ogura et al. | 358/111 |
| 4,646,148 | 2/1987 | Lienard et al. | 382/56 |
| 4,647,986 | 3/1987 | Vaughn et al. | 358/111 |
| 4,654,877 | 3/1987 | Shimoni et al. | 382/56 |
| 4,709,232 | 11/1987 | Leger | 340/731 |
| 4,712,140 | 12/1987 | Mintzer et al. | 358/260 |
| 4,748,511 | 5/1988 | Nichols et al. | 358/111 |
| 4,755,889 | 7/1988 | Schwartz | 360/32 |
| 4,797,739 | 1/1989 | Tanaka | 358/133 |
| 4,837,617 | 6/1989 | Brusewitz | 358/133 |
| 4,971,407 | 11/1990 | Hoffman | 375/122 |

OTHER PUBLICATIONS

"A Method for the Construction of Minimum-Redundancy Codes" by David A. Huffman, Proceedings of the I.R.E. 40, 10 pp. 1098-1100 (1952).

Primary Examiner—Ulysses Weldon
Assistant Examiner—Doon Yue Chow
Attorney, Agent, or Firm—Rogers, Howell & Haferkamp

[57] ABSTRACT

A display device having 8-bit architecture includes a decoder for decoding 8-bit bytes of data representative of pixel intensities of 12 bits sufficiently fast to enable the display in flicker-free manner of an image having a frame of 1024×1024 pixels. The decoder is hardware based and consists of electronic circuitry without the use of programmed devices incorporating software logic. The decoder may be utilized in new display devices or used to retrofit existing 8-bit architecture display devices. An encoder is also disclosed for encoding 12-bit pixel data into 8-bit data for storage or transmission to the display device.

14 Claims, 6 Drawing Sheets

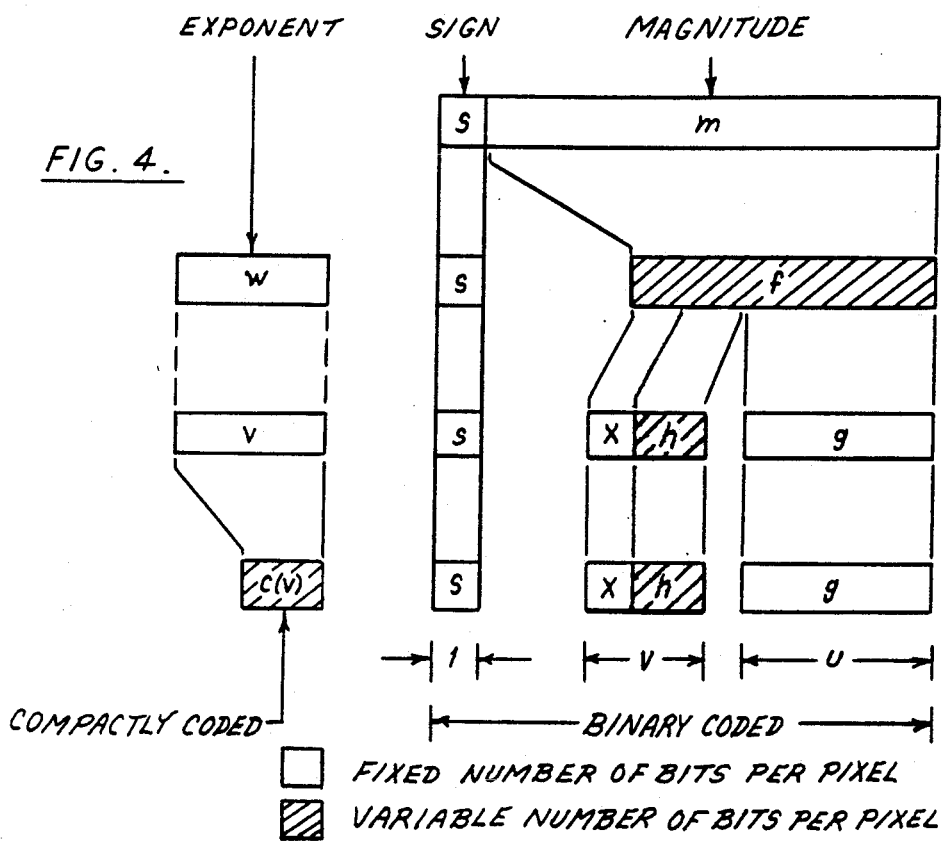

| FMS STATE TABLE |||
| STATE | NEXT STATE<br>0     1 | INPUT DATA TO<br>OUTPUT BIT NO. |
|---|---|---|
| 1+ | 2+    1- | 1 |
| 2+ | 3+    1- | 2 |
| 3+ | 4+    2- | 3 |
| 4+ | 5+    3- | 4 |
| 5+ | 6+    4- | 5 |
| 6+ | 7+    5- | 6 |
| 7+ | -      6- | 7 |
| 6- | 5-    5- | 6 |
| 5- | 4-    4- | 5 |
| 4- | 3-    3- | 4 |
| 3- | 2-    2- | 3 |
| 2- | 1-    1- | 2 |
| 1- | 1+    1+ | 1 |

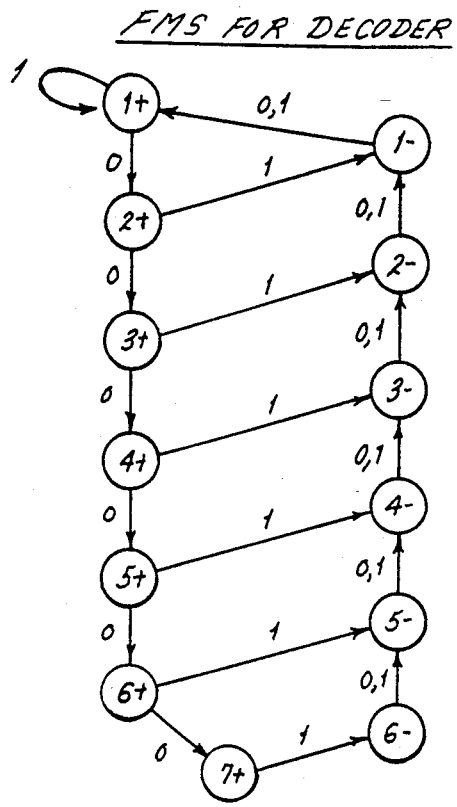

VIDEO DISPLAY WITH HIGH SPEED RECONSTRUCTION AND DISPLAY OF COMPRESSED IMAGES AT INCREASED PIXEL INTENSITY RANGE AND RETROFIT KIT FOR SAME

BACKGROUND AND SUMMARY OF THE INVENTION

Recently, personal computer and workstation manufacturers have introduced a large number of products having video displays that use display buffers with storage for 8 bits of gray scale or for 8 bits of each of the three primary colors. The popularity of 8-bit display buffers is understandable because of the universality of memory word lengths, bus widths and disk and network software that use an 8-bit byte (or some multiple thereof) as the basic unit of information. Furthermore, it has been well demonstrated that the human visual system cannot distinguish even the 256 levels of gray that can be coded in 8 bits. It seems likely that this defacto standardization on 8-bit displays and display buffers will continue and even become more pronounced with the near term introduction of increasingly compact, low cost workstations.

In contrast to this trend, many applications require video displays and display buffers with higher intensity resolution than 8 bits. In particular, images from film scanning and computed radiography have intensity resolutions from 10–12 bits and radiologists are generally unwilling to sacrifice the information present in these images to take advantage of the economies of 8-bit display systems. In video displays adapted specifically for those applications, the radiologists can adjust contrast controls by positioning an adjustable intensity window and through use of several settings of these controls utilize all of the intensity information present in the image even though less than 256 levels of gray can be seen for any one setting of these controls. In other words, when the radiologist is viewing a portion of the image which appears particularly dark, he can adjust the intensity window to lighten up this particular area to view the otherwise imperceptible detail therein due to the low intensity of that particular portion. Similarly, the radiologist can adjust the intensity window in the opposite direction to view the detail in other areas of the image which appear to be overexposed. Thus, although the human eye can discern differences of intensity at any one time of less than 256 levels of gray (8 binary bits), having the additional information present as provided by the four extra bits of intensity permits additional detail to be analyzed in the image.

While 12-bit video displays are available, they are more expensive than 8-bit displays as they utilize 12-bit architecture, and are not built in the same quantities as 8-bit displays. Additionally, they require 12-bit display buffers for storing digital data corresponding to the images. Obviously, 12-bit display buffers are more expensive than 8-bit display buffers and with the simultaneous use of both 8-bit and 12-bit display systems, one system's display buffers is incompatible with the other system's display which results in reduced ability to share information between systems.

To solve these and other problems in the prior art, the inventors herein have succeeded in designing and developing a high speed encoding circuit and high speed decoding circuit for transforming 12-bit pixel intensity data to an 8-bit, partially encoded, byte and also decoding the 8-bit byte into the 12-bit intensity data "on the fly" so as to permit an 8-bit display device to display in a flicker-free manner the pixels comprising a 1024×1024 frame with 12 available bits of intensity. The term "flicker free" is well understood to be that minimal display refresh rate required in order to render the flickering of the display caused by the periodic refreshing thereof to be imperceptible to the human eye. For most displays and applications, this rate has been found to be approximately 60 frames per second. Both the encoder and decoder are hardware based circuits, thereby avoiding the inherent delays required for those algorithms which are computationally complex or storage intensive and which ordinarily require the execution of computer instructions or other software based logic. The decoding circuit disclosed herein can be readily incorporated into a new video display device having an 8-bit architecture and the circuit can be easily enabled or disabled so that the display device can be used to display frame buffers storing 8 bit intensity data or frame buffers storing partially encoded 8-bit bytes representative of 12-bit intensity data. The encoder is particularly useful in converting 12-bit data and storing it in the 8-bit partially encoded format disclosed herein in 8-bit frame buffers for later display by a video display device. Although image sources are not presently available which produce 12-bit intensity images at sufficient rates of speed to be "on-line" with the video display device capable of producing images having 12-bit intensity, it is anticipated that such image sources will become available such that the encoder and decoder circuits and techniques disclosed herein may be used to view images at 12-bit intensity levels in real time with 8-bit architecture hardware.

In addition to its use in manufacturing new video displays, the present invention may also be utilized in retrofit kit form to convert existing 8-bit video displays for use in displaying images at 12-bit intensity levels. Thus, the present invention may be used to upgrade existing video displays and prevent their becoming obsolete with the implementation of the techniques disclosed herein.

In essence, the encoding and decoding techniques relied on herein for achieving compression of 12-bit data to 8-bits involves predicting the value of a pixel to be transmitted by calculating the difference between its intensity and its predecessor's intensity and transmitting only the differential obtained from this calculation. The differential is itself a 13-bit number which is divided into a first portion which is transmitted without encoding. In the preferred embodiment this portion is 5 bits wide. The second portion of the differential data is compactly encoded so that the average number of bits transmitted per pixel is comparable to the average entropy per pixel. The goal is to transmit as much information as possible without encoding so as to minimize the encoding and decoding task to thus simplify it and achieve high speed data transmission rates.

While the invention is disclosed generally for use with images of various types, it has been found to work best with images generated through over sampling which are characterized by pixels having a relatively high degree of correlation. Thus, differential values between adjacent pixels are minimal such that encoding the differential value can be efficiently done with the coding techniques disclosed herein.

While the principal advantages and features of the present invention have been described above, a clearer understanding of the invention and its purposes may be attained by referring to the drawings and description of the preferred embodiment which follow.

BRIEF DESCRIPTION OF THE DRAWINGS

FIG. 4 is a diagram detailing the bit mapping for the 12-bit data as it is encoded into 8-bit data;

FIG. 5 is the finite state machine state table for the encoder;

FIG. 8 is the state diagram for the decoder finite state machine, and

FIGS. 9a and 9b are examples explaining the coding scheme of the present invention.

DETAILED DESCRIPTION OF THE PREFERRED EMBODIMENT

Figure 1:
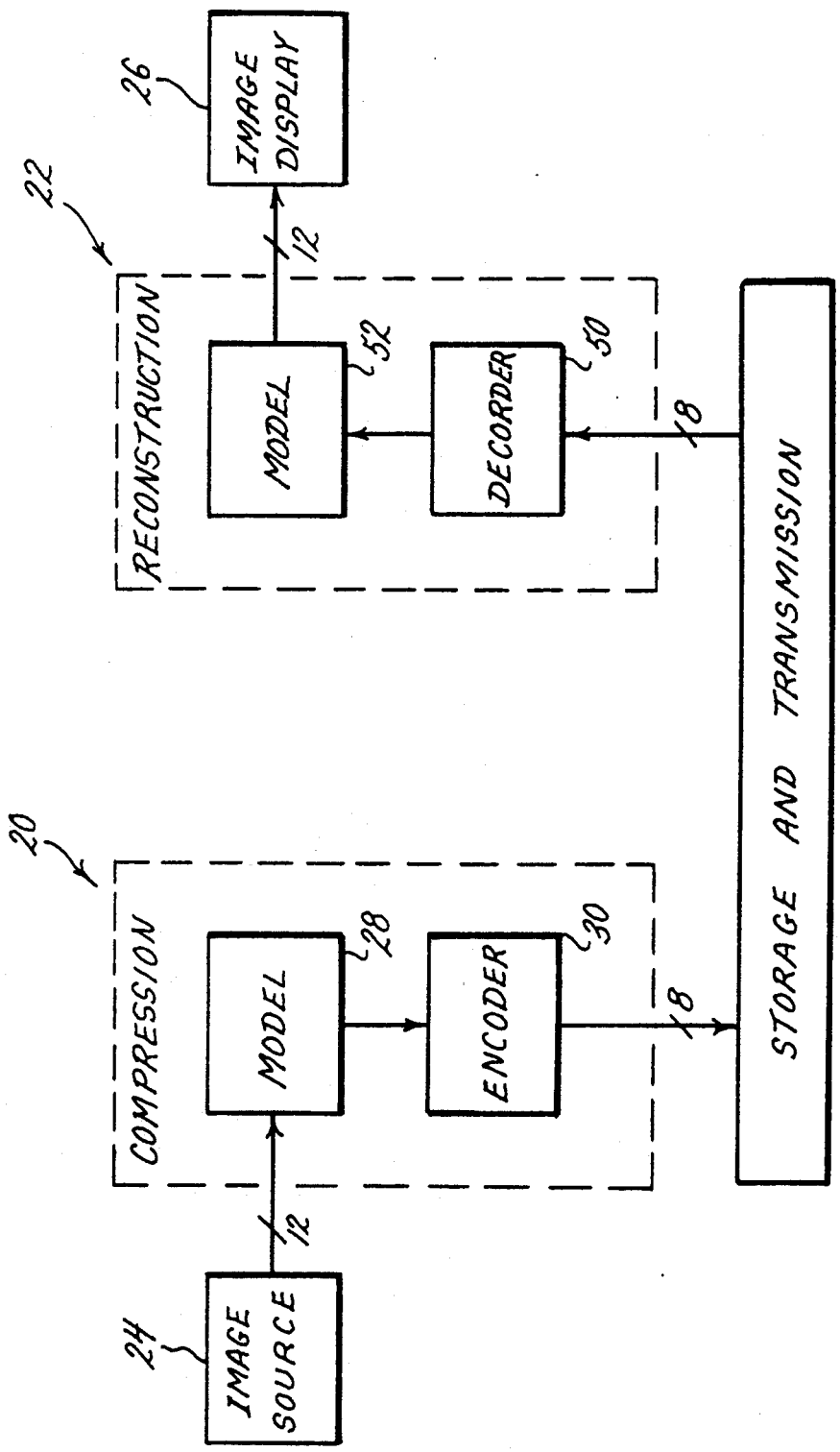
FIG. 1 is a block diagram depicting the encoding and decoding circuits of the present invention and their relationship with an image source and image display.

As shown in FIG. 1, the present invention includes both an encoding circuit 20 and a decoding circuit 22. The encoding circuit 20 processes 12-bit pixel intensity data received from an image source 24 and encodes it into 8 bits of data for storage and/or transmission. The decoding circuit 22 receives 8-bit data from storage or as a result of transmission from the encoding circuit 20 and decodes it into 12-bit pixel intensity data for display by an image display 26. Thus, with the present invention, images constructed of pixels with 12-bit intensity values may be compressed into 8-bit bytes of differential data for storage or transmission and then decoded at rates sufficient to support flicker-free display of an image having a frame size of 1024×1024 pixels.

Figure 2:
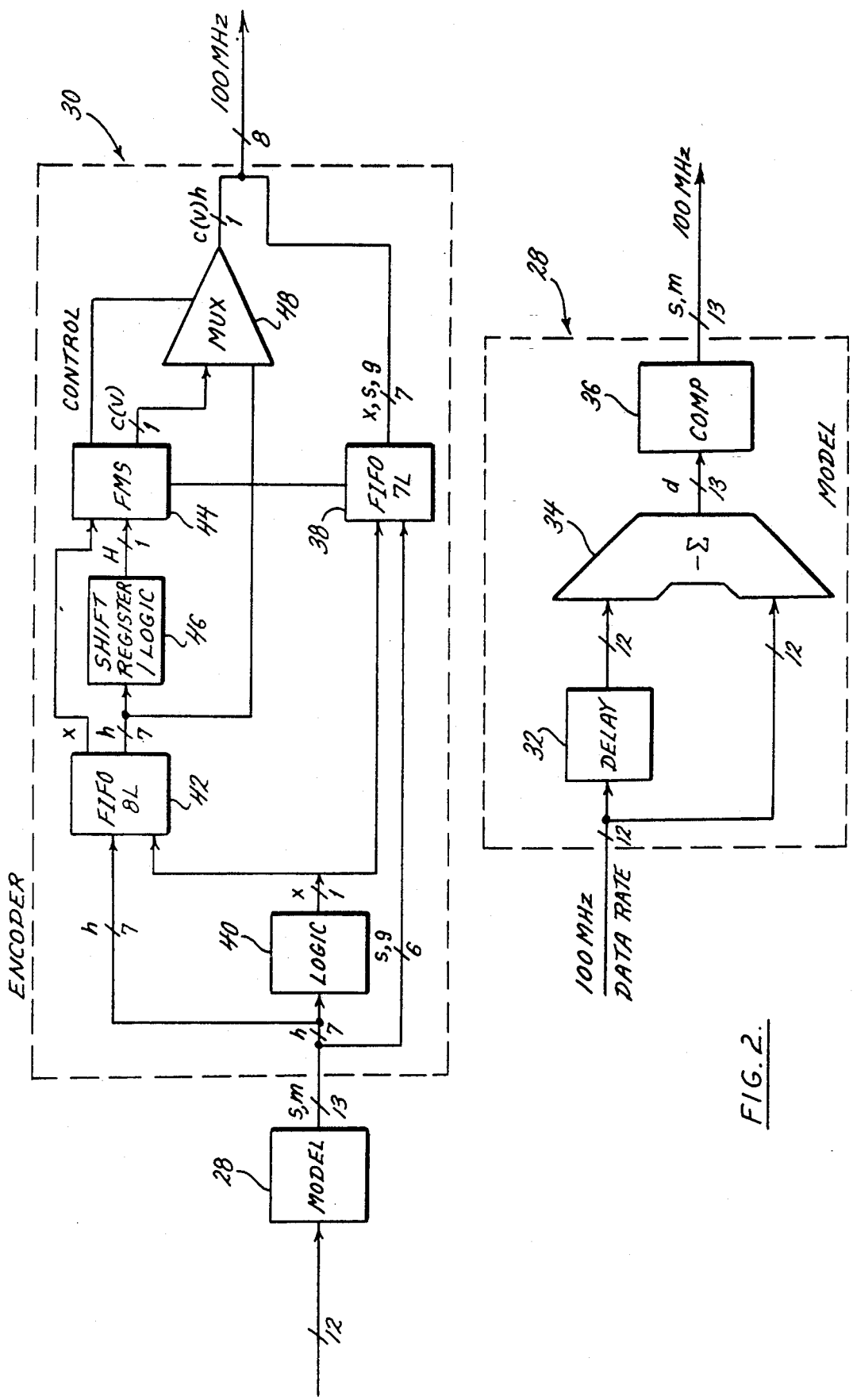
FIG. 2 is a schematic diagram of the encoder and model for compressing the 12-bit intensity level data to 8 bits.
Figures 6, 7:
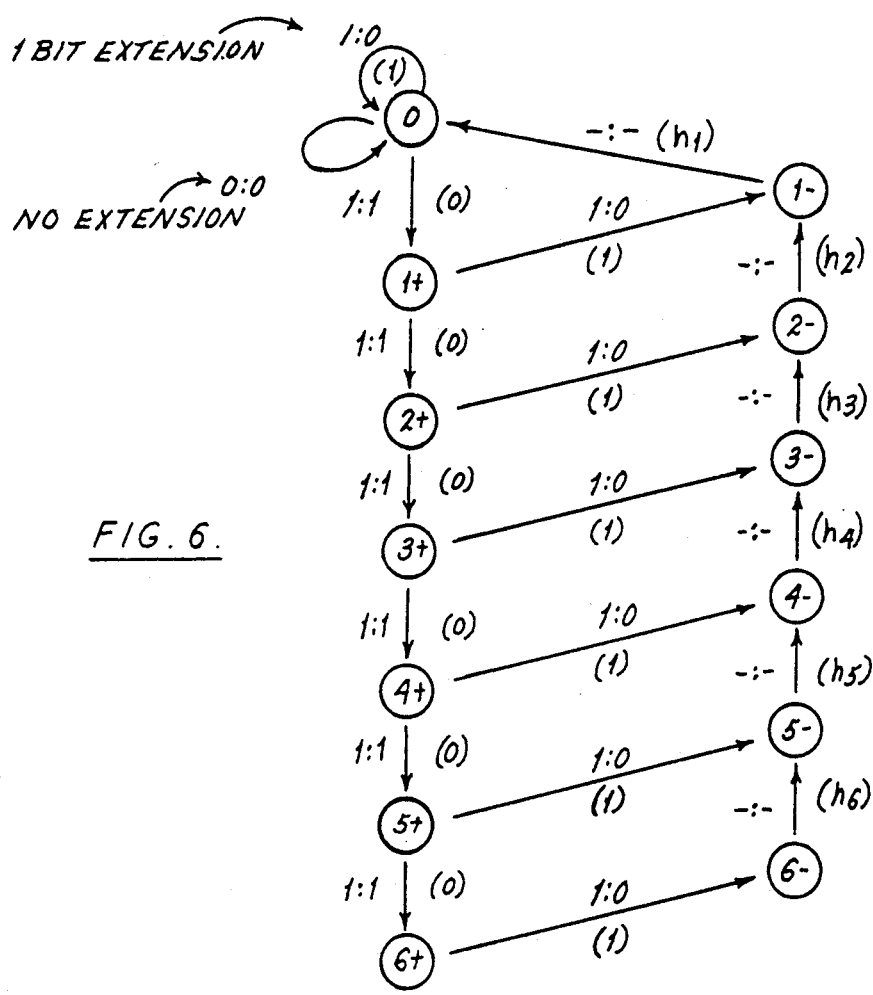
FIG. 6 is the state diagram for the encoder finite state machine.
FIG. 7 is the state table for the decoder finite state machine.

As shown in FIGS. 1 and 2, the encoding circuit 20 is comprised of a model 28 and an encoder 30. The model 28 includes a delay circuit 32 in the form of a 12-bit register so that one pixel intensity can be subtracted from the previous pixel intensity by a subtracter 34 to generate a 13-bit difference value. A complement circuit 36 complements negative values to generate a sign bit and a magnitude. These 13 bits are then input to the encoder 30. The sign bit and the five least significant bits (g) are split off and input to a FIFO buffer 38. The seven most significant bits of the magnitude are input to a logic circuit 40 and a FIFO buffer 42. Logic circuit 40 generates an output if any of the seven bits are non zero and its output is identified as x. The buffer 42 outputs x to a finite state machine 44 and the seven most significant bits (h) to a shift register/logic circuit 46 as well as a multiplexer 48. The shift register/logic circuit 46 produces H which is the logical OR of the bits in h, excluding the least significant bit which the finite state machine 44 uses along with x to control the buffer 38 and multiplexer 48 to generate 8-bit bytes at their output which includes either c(v) or h, as appropriate. A specific example of a finite state machine as used by the inventors herein is disclosed and explained in FIG. 5 and FIG. 6.

Figure 3:
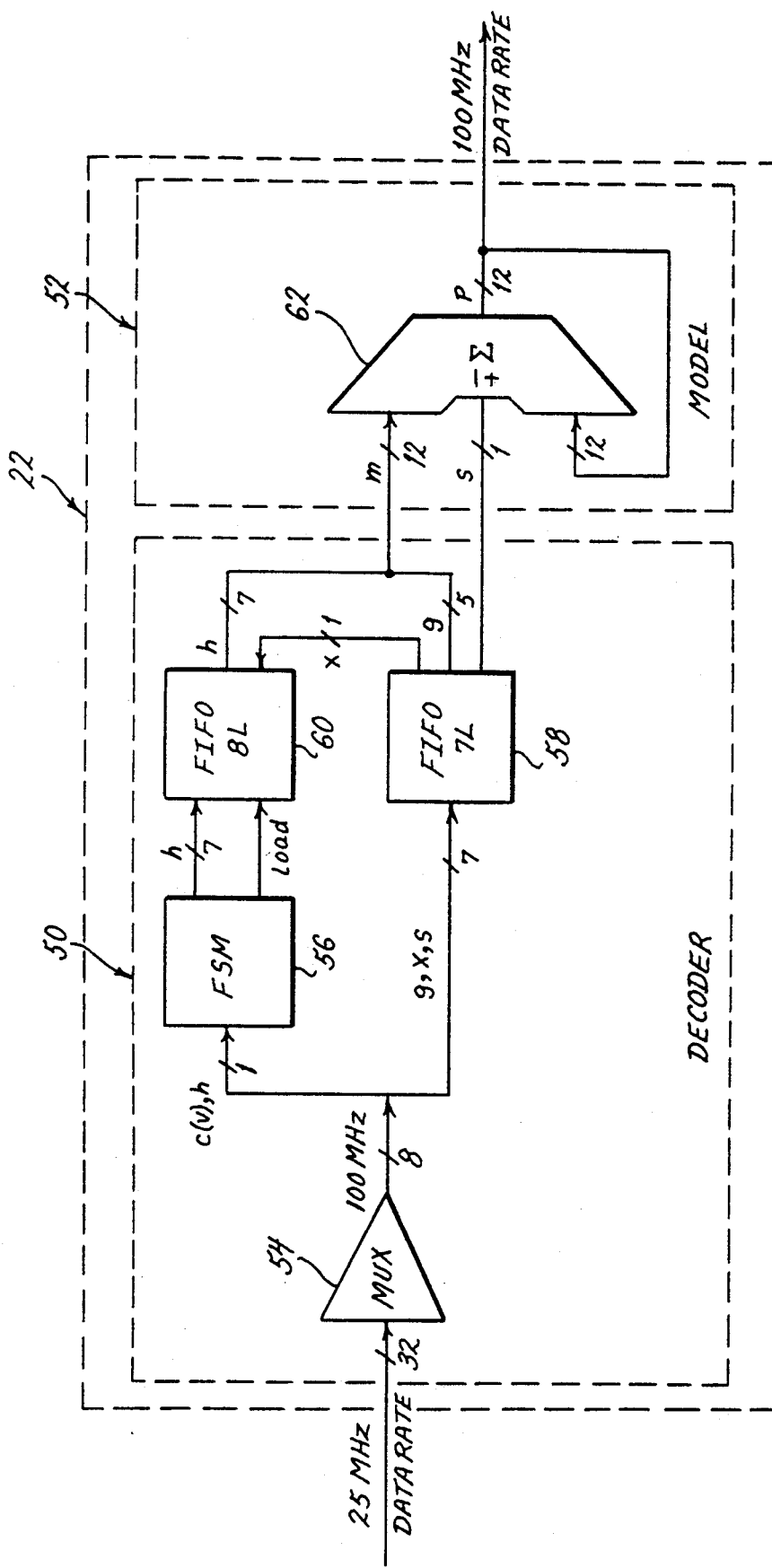
FIG. 3 is a schematic diagram of the decoder and model for reconstructing 12-bit intensity level from 8-bit encoded data.

As shown in FIG. 3, the decoding circuit 22 includes a decoder 50 and a model 52 to mirror the model 28 and encoder 30 of encoder circuit 20. As shown in FIG. 3, encoded pixel data is typically transmitted at 25 Mhz, 4 bytes at a time requiring a data path 32 bits wide. A multiplexer 54 transforms that data stream to a 100 Mhz 8-bit wide data stream which is split with one bit comprising c(v), h being input to the finite state machine 56 and seven bits comprising g, x, and s being input to buffer 58. Finite state machine 56 decodes c(v) and generates h in 7-bit parallel format to buffer 60. A specific example of a finite state machine 56 as used by the inventors herein is disclosed and explained in FIG. 7 and FIG. 8. x is then used to coordinate buffers 58 and 60 to produce g and h which, when combined, result in the magnitude m which is 12 bits wide for input to the summing circuit 62 of model 52. Additionally, the sign bit s is also input to summing circuit 62 which then adds or subtracts the differential from the previous pixel value to generate the next pixel value.

With the particular hardware disclosed herein, various compact coding schemes and various FSM designs could be utilized in order to generate the various functions assigned and described above. The inventors will now disclose and describe one such compact coding scheme with which the circuits described above have been found to operate satisfactorily. Coding Since the reconstruction model predicts the value of each pixel from certain previously transmitted information, it is only necessary for the reconstruction system to receive d the differential between the predicted and recorded values of a pixel. d is expressed in sign magnitude form. The sign s of the differential has about equal probability of being positive or negative providing the source model is effective in removing interpixel correlations. Thus, the sign of the differential cannot be transmitted in appreciably less than 1 b/p because its entropy approaches unity. On the other hand, the magnitude m of the differential can benefit from additional coding. It can be viewed as a positive, binary-weighted integer. As is depicted in FIG. 4, the magnitude of the differential is, in turn, divided into two parts: 1) the magnitude expressed as a fraction f and 2) a binary exponent w to scale the fraction to the correct magnitude. Thus, $$d=(-1)^S(f2^W)$$

The exponent w is chosen so that f is always less than 1. The exponent is divided into a fixed part and a variable part, $w=u+v$. The variable part v specifies the number of bits required to express any portion of f that extends beyond the fixed width u. Generally, u is chosen so that the extension of the fraction beyond u bits occurs less than half the time even in the most difficult regions of the image. An extension bit x specifies the presence of such an extension h of the fixed part of the fraction g. With this additional decomposition, d is expressed as $$d=(-1)^S(g+e)2^u$$

when $x=1$ and where $e=h2^v$ is called the extension of the fraction. When $x=0$, we have no extension and d is simply $$d=(-1)^S g2^u$$

The fixed portion of the exponent u need not be transmitted, but g and s need to be transmitted for every pixel. For those pixels for which x=1, in addition both h and v need to be transmitted. Finally, x must be transmitted and can be coded with v or, as shown in FIG. 4, be transmitted as a single bit with every pixel. In this latter form, the fixed width, binary coded part of the transmission contains g, x and s and requires u+2 b/p. The fractional part h of the extension is also binary coded, but variable in width. Compact coding for g, h, x and s is not required if the width of the extension specified by v can be coded in the remaining bits. For images recorded with 12-bit pixels as in the present invention, u is chosen to be 5 which requires that v varies from 1-7. Thus, v can be represented by 3 bits in binary coded form, but because of its strongly skewed distribution it can be represented in fewer bits on average in coded form c(v). The extension $e = h2^v$ can thus be transmitted as a variable length code $c(e)=(c(v),h)$. Note that it is necessary for the decoder to know v even though the number of bits in h determines v. This is true because the decoder needs to be able to parse the sequential transmission of multiple interleaved values of c(v) and h, each of a possibly different length. Furthermore, it is not necessary to transmit the most significant bit of h because of any non-zero extension this bit is always one and, consequently, can be easily restored during decoding. Thus, the total information required for the transmission of g, h, x and s is $u+(v-1)+2=u+v+1$ b/p. It should also be noted that x is identical to the most significant bit of the extension.

An example of this encoding scheme is shown in FIG. 9a. As suggested therein, h is chosen as binary 10. Thus, v (the bit width of h) is 2 and from the code table, c(v) is equal to 01. Referring to the bit stream represented by the cross-hatched block, five bytes of 8-bits each are represented therein. These are bytes numbers 1-5 with byte No. 1 being transmitted first and byte No. 5 being transmitted last. As shown therein, the first five bits are transmitted directly as g. x and s are also directly transmitted with 1 bit assigned to each. All of the foregoing are transmitted in parallel format. However, the last bit of each byte is used to serially transmit c(v) and h. Thus, in byte No. 1, x=1 thereby indicating that there exists a c(v) and h to be captured and used to reconstruct the pixel represented by byte No. 1. Then, these values are transmitted serially as shown in the diagram as 0 in byte No. 1, 1 in byte No. 2, and 0 in byte No. 3. The most significant bit of h need not be transmitted as it is assumed to be 1. Thus, 3 bits are required to transmit c(v) and h for this particular value. However, because most pixels do not have extensions, the average number of bits required to transmit c(v) and h is less than 1, those functions can be transmitted by assigning only one bit per byte to their values.

A second example is shown in FIG. 9b for a value of h=1010. For this example, v=4 and c(v)=0001. A bit stream is represented for only the relevant bit, as shown. For this example, seven bits of data are required to complete the transmission of h=1010.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a video display having means for displaying an image comprised of a plurality of pixels, and means for refreshing said image, the improvement comprising means for decoding a parallel 8-bit encoded data stream representative of a pixel intensity of 12 binary bits into said 12 binary bits at a rate sufficiently fast to generate sufficient pixel intensity data for said refreshing means to refresh an image having a frame size of approximately 1024×1024 pixels at a rate of approximately 60 frames per second, thereby producing a substantially flicker-free image at up to 4096 available pixel intensity levels encoded as 12 binary bits, wherein said 8 bits of pixel intensity data is comprised of data representative of the difference in intensity between adjacent pixels in the image, said differential data having two portions, a first portion comprised of direct binary data and a second portion comprised of compactly coded binary data, said portions together comprising said 8 bits.

2. The device of claim 1 wherein said decoding means is comprised of a non-programmed electronic circuit, said decoding means thereby being a hardware decoder.

3. The device of claim 2 wherein said video display has an 8-bit architecture including means for reading a frame buffer storing pixel intensity data in no more than 8 bits per pixel.

4. The device of claim 1 wherein said decoder can decode said data stream at a nominal rate of at least 100 Mhz.

5. The device of claim 1 wherein said decoding means further comprises a finite state machine (FSM) having means for decoding the compactly coded portion of said differential data.

6. The device of claim 5 wherein said decoding means includes reconstruction means including means for summing successive 13-bit differential pixel data into sums, each of said sums being representative of a pixel's intensity.

7. The device of claim 6 wherein said decoding means further comprises buffer means for synchronizing the output of the FSM with the direct binary data, said synchronized FSM output and direct binary data being input to said reconstruction means.

8. An encoding device having means for encoding a parallel 12-bit data stream representative of the pixel intensity for a video image into 8 binary bits at a rate sufficiently fast to provide pixel intensity data for the display of a video image having a frame size of approximately 1024×1024 pixels with a refresh rate of approximately 60 frames per second, said encoding means including a hardware encoder comprised of a non-programmed electronic circuit, wherein said 8 bits of pixel intensity data is comprised of data representative of the difference in intensity between adjacent pixels in the image, said differential data having two portions, a first portion comprised of direct binary data and a second portion comprised of compactly coded binary data, said portions together comprising said 8 bits.

9. The device of claim 8 wherein said encoder can encode said data stream at a nominal rate of 100 Mhz.

10. The device of claim 8 wherein the encoding means further comprises means for encoding the compactly coded portion of said differential data.

11. The device of claim 10 wherein compact coding encoding means comprises a finite state machine.

12. A retrofit kit for converting an 8-bit architecture video display having means for displaying video images with pixels having 8 binary bit intensity levels into an 8-bit architecture video display having means for displaying video images with pixels having an available 12 binary bit intensity level from encoded 8 binary bit pixel data, said retrofit kit comprising a hardware decoder comprised of a non-programmed electronic circuit, wherein said 8 bits of pixel intensity data is comprised of data representative of the difference in intensity between adjacent pixels in the image, said differential data having two portions, a first portion comprised of direct binary data and a second portion comprised of compactly coded binary data, said portions together comprising said 8 bits.

13. The device of claim 12 wherein said hardware decoder has means for generating 12 bit pixel intensity data at a rate sufficiently fast to permit said video display to operate at a refresh rate of approximately 60 frames per second with images of approximately 1024×1024 pixels, thereby producing a substantially flicker-free display.

14. In an 8-bit architecture video display having means for displaying an image comprised of a plurality of pixels having an intensity of 8 binary bits, and means for refreshing said image, the improvement comprising a hardware decoding means for reading 8 binary bits of encoded data representative of 12 binary bits of pixel intensity and converting said encoded data into its corresponding 12 binary bits, said decoding means having means for operating at a speed sufficiently fast to permit said display to display an image having 1024×1024 pixels flicker-free with substantially all of said pixels having an available 12-bit intensity, wherein said 8 bits of pixel intensity data is comprised of data representative of the difference in intensity between adjacent pixels in the image, said differential data having two portions, a first portion comprised of direct binary data and a second portion comprised of compactly coded binary data, said portions together comprising said 8 bits.

* * * * *